US008527246B1

(12) United States Patent
Chu

(10) Patent No.: US 8,527,246 B1
(45) Date of Patent: Sep. 3, 2013

(54) METHOD FOR MODELING CONDUCTOR SURFACE ROUGHNESS

(75) Inventor: Yunhui Chu, Portland, OR (US)

(73) Assignee: Agilent Technologies, Inc., Santa Clara, CA (US)

( * ) Notice: Subject to any disclaimer, the term of this patent is extended or adjusted under 35 U.S.C. 154(b) by 456 days.

(21) Appl. No.: 12/869,855

(22) Filed: Aug. 27, 2010

(51) Int. Cl.
*G06G 7/48* (2006.01)

(52) U.S. Cl.
USPC .............................................................. 703/6

(58) Field of Classification Search
USPC .............................................................. 703/6
See application file for complete search history.

(56) References Cited

U.S. PATENT DOCUMENTS

2004/0170870 A1* 9/2004 Yokoyama et al. ..... 428/694 ST

OTHER PUBLICATIONS

Sijerčić et al., "Modeling surface roughness with an array of hemispheres", MIPRO, 2010 Proceedings of the 33rd International Convention, May 2010, pp. 67-72.*
S. Hall et al., "Multigigahertz Causal Transmission Line Modeling Methodology Using a 3-D Hemispherical Surface Roughness Approach", IEEE Transactions on Microwave Theory and Techniques, vol. 55, Issue 12, Dec. 2007, pp. 2614-2624.
E. Hammerstad et al., "Accurate Models for Microstrip Computer-Aided Design", Microwave symposium Digest, IEEE MTT-S International, 1980, pp. 407-409.
S. H. Hall et al., "Appendix E: Casual Relationship Between Skin Effect Resistance and Internal Inductance for Rough Conductors", Advanced Signal Integrity for High-Speed Digital Designs, John Wiley & Sons, Inc., 2009, pp. 649-651.
P. Huray, "Chp. 6: Surface Roughness", The Foundations of Signal Integrity, Publication Year: Nov. 2009, pp. 272-273.

* cited by examiner

*Primary Examiner* — Omar Fernandez Rivas
*Assistant Examiner* — Herng-Der Day

(57) ABSTRACT

A method provides modeling of surface roughness effect of an electrical conductor. The method includes identifying first protrusions of a first level using an original flat surface of the conductor as a first base surface and determining a first correction factor of the first level using parameters of the first protrusions. The method further includes identifying second protrusions of a second level using the first protrusions and the first base surface as a second base surface, and determining a second correction factor of the second level using parameters of the second protrusions and regarding the second base surface as being a smooth surface, the smooth surface being a surface of the conductor without surface roughness effect. A final correction factor of the conductor is determined by combining the first correction factor and the second correction factor.

20 Claims, 10 Drawing Sheets

(a)

(b)

(c)

(a)

Level 1

Level 2

Level 3

(b)

Level 1

Level 2

Level 3

(c)

(a)

(b)

METHOD FOR MODELING CONDUCTOR SURFACE ROUGHNESS

BACKGROUND

High speed circuit designs, such as signal and/or power integrity designs, package designs, and printed circuit board designs, rely on computer implemented simulation tools. The simulation tools include various modeling algorithms, which should be accurate and efficient over a broad frequency range in order to be useful. Transmission line modeling, in particular, is critical in circuit simulations, including how to accurately and efficiently model conductor surface roughness effect over a broad range of frequencies.

Generally, there are two categories of conventional methods for modeling the conductor surface roughness effect: numerical models and analytical (or empirical) models. Numerical models calculate the conductor surface roughness effect through numerical electromagnetic simulations on specific roughness structures, but are typically too computationally expensive to be incorporated into circuit simulations. Analytical models, which are more appropriate for circuit simulations, calculate a correction factor that is applied to the surface impedance of a smooth surface to take into account power loss and signal delay due to conductor surface roughness. Analytical models for modeling surface roughness include the Hammerstad model, e.g., described by Hammerstad et al., "Accurate Models for Microstrip Computer Aided Design," IEEE MTT-S INT. MICROW. SYMP. DIG., pp. 407-409 (May 1980); the hemispherical model, e.g., described Hall et al., "Multigigahertz Causal Transmission Line Modeling Methodology Using a 3-D Hemispherical Surface Roughness Approach," IEEE TRANS. MTT, Vol. 55, No. 12, pp. 2614-2624 (December 2009), and Hall et al., "Advanced Signal Integrity for High-Speed Digital Designs," JOHN WILEY & SONS, INC. (2009); and the Huray model, e.g., described by Huray, "The Foundations of Signal Integrity," WILEY-IEEE PRESS (November 2009), each of which is hereby incorporated by reference.

The Hammerstad model loses accuracy at high frequencies. For example, for the roughest copper commonly used in the industry, the Hammerstad starts to break down after about 5 GHz. The hemispherical model works for a broader range of frequencies than the Hammerstad model, but still loses accuracy as frequency increases and cannot fulfill the need for high-speed circuit design. The Huray model may provide relatively good accuracy for frequencies up to 50 GHz. However, the accuracy is dependant on certain model parameter values, such as numbers and sizes of metallic balls (e.g., referred to as "snowballs"), and these values are not easily determined. The appropriate combination of these model parameter values providing the best accuracy must be determined empirically, by trying various combinations and comparing the corresponding simulation results against measured data (e.g., insertion loss). The optimal combination will also vary from one particular surface roughness profile to another. Accordingly, none of the conventional models provides efficient and reliable modeling, particularly with respect to rough conductor surfaces, for a broad range of frequencies.

SUMMARY

In a representative embodiment, a method is provided for modeling surface roughness effect of an electrical conductor. The method includes identifying first protrusions of a first level using an original flat surface of the conductor as a first base surface; determining a first correction factor of the first level using parameters of the first protrusions; identifying second protrusions of a second level using the first protrusions and the first base surface as a second base surface; and determining a second correction factor of the second level using parameters of the second protrusions and regarding the second base surface as being a smooth surface. The smooth surface is a surface of the conductor without surface roughness effect. A final correction factor of the conductor is determined by combining the first correction factor and the second correction factor.

In another representative embodiment, a computer readable medium for storing a program, executable by a computer system, is provided for modeling surface roughness effect of an electrical conductor. The computer readable medium includes an identifying code segment for identifying first protrusions of a first level using an original flat surface of the conductor as a first base surface, and for identifying second protrusions of a second level using the first protrusions and the first base surface as a second base surface. The computer readable medium further includes a determining code segment for determining a first correction factor of the first level using parameters of the first protrusions, and for determining a second correction factor of the second level using parameters of the second protrusions and regarding the second base surface as a smooth surface, the smooth surface being a surface of the conductor without surface roughness effect. A final determining code segment is for determining a final correction factor of the conductor by multiplying the first correction factor and the second correction factor.

In another representative embodiment, a method is provided for modeling surface roughness effect of an electrical conductor using a multi-level model. The method includes identifying protrusions corresponding to multiple model levels, protrusions of a first model level being identified using an original flat surface of the conductor as a base surface, and protrusions of each subsequent model level being identified using protrusions and a base surface of an immediately preceding model level as a base surface of the subsequent model level. The method further includes determining multiple level correction factors for the multiple model levels, respectively, using parameters of the protrusions corresponding to the model levels; determining a final correction factor of the conductor by multiplying the level correction factors; and calculating a final surface resistance of the conductor by multiplying the final correction factor of the conductor and a surface resistance of the original flat surface of the conductor. The protrusions of each subsequent model level are smaller than the protrusions of the immediately preceding model level.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3(*b*) shows decomposed roughness profiles corresponding to levels of the multi-level hemispherical model, according to a representative embodiment.

FIG. 3(*c*) shows flattened roughness profiles corresponding to levels of the multi-level hemispherical model, according to a representative embodiment.

FIG. 8(*b*) is a graph showing insertion loss and frequency for measured data and for simulation results using two levels of the hemispherical model, according to a representative embodiment.

DETAILED DESCRIPTION

Figure 1A:
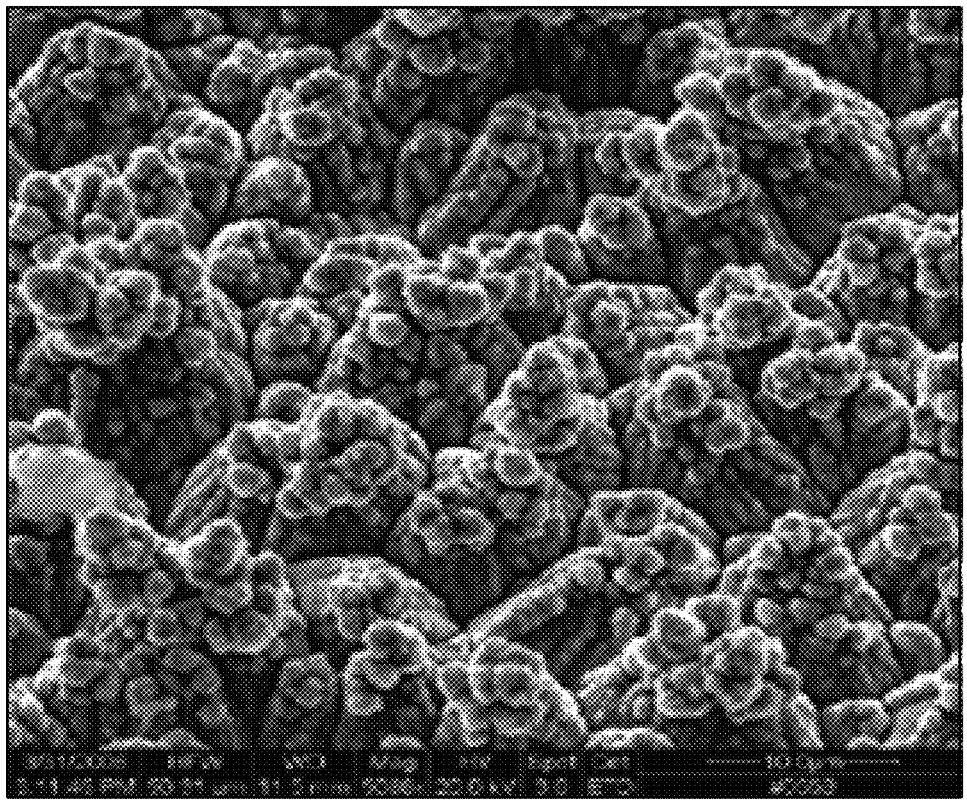
FIG. 1(a) is an image including a scanning electron microscopy (SEM) photograph of a rough copper surface of a conductor.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Generally, various representative embodiments provide an analytical model, e.g., implemented using software algorithms executable by a computer processor, for multi-level modeling of a surface roughness effect of an electrical conductor. The multi-level model enables a user to fit measured data over an arbitrary frequency bandwidth through a straightforward parameter synthesis procedure when measured data is available. Measured S-parameter data, for example, may be used to synthesize the multi-level model, e.g., to determine the model parameters by fitting the measured data, and to verify the results of the multi-level model, as discussed below. Once the model parameters are determined, the multi-level model may be executed for various transmission line settings without any measured data.

Figure 1B:
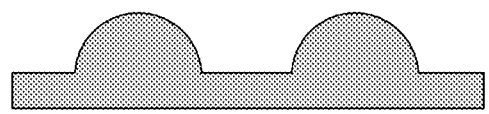
FIG. 1(b) shows a roughness profile of the copper surface shown in FIG. 1(a), using a conventional single level hemispherical model.

FIG. 1(*a*) is shows a scanning electron microscopy (SEM) photograph of a rough copper surface of a conductor. The roughness texture generally consists of protrusions of hierarchical levels of dimensions. As frequency of a signal passing through the conductor increases and the skin depth decreases, e.g., as a function of increasing frequency, protrusions of smaller dimensions begin to contribute to the conductor loss, effectively increasing insertion loss of the conductor. This hierarchical nature of the surface roughness effect as a function of frequency must be properly characterized to obtain an accurate model for a broad frequency range.

The protrusions on the conductor surface may be represented by various modeling techniques, such as the Hammerstad model, the hemispherical model and the Huray model, discussed above. FIG. 1(*b*) is a roughness profile of the copper surface shown in FIG. 1(*a*) using a conventional single level hemispherical model. As shown, the single level hemispherical model characterizes the rough surface with hemispheres of uniform size on a flat plane. As discussed above, the hemispherical model is inaccurate at high frequencies, largely because the single level hemispherical model does not take into account the contribution from protrusions much smaller than the hemispheres.

Figure 2:
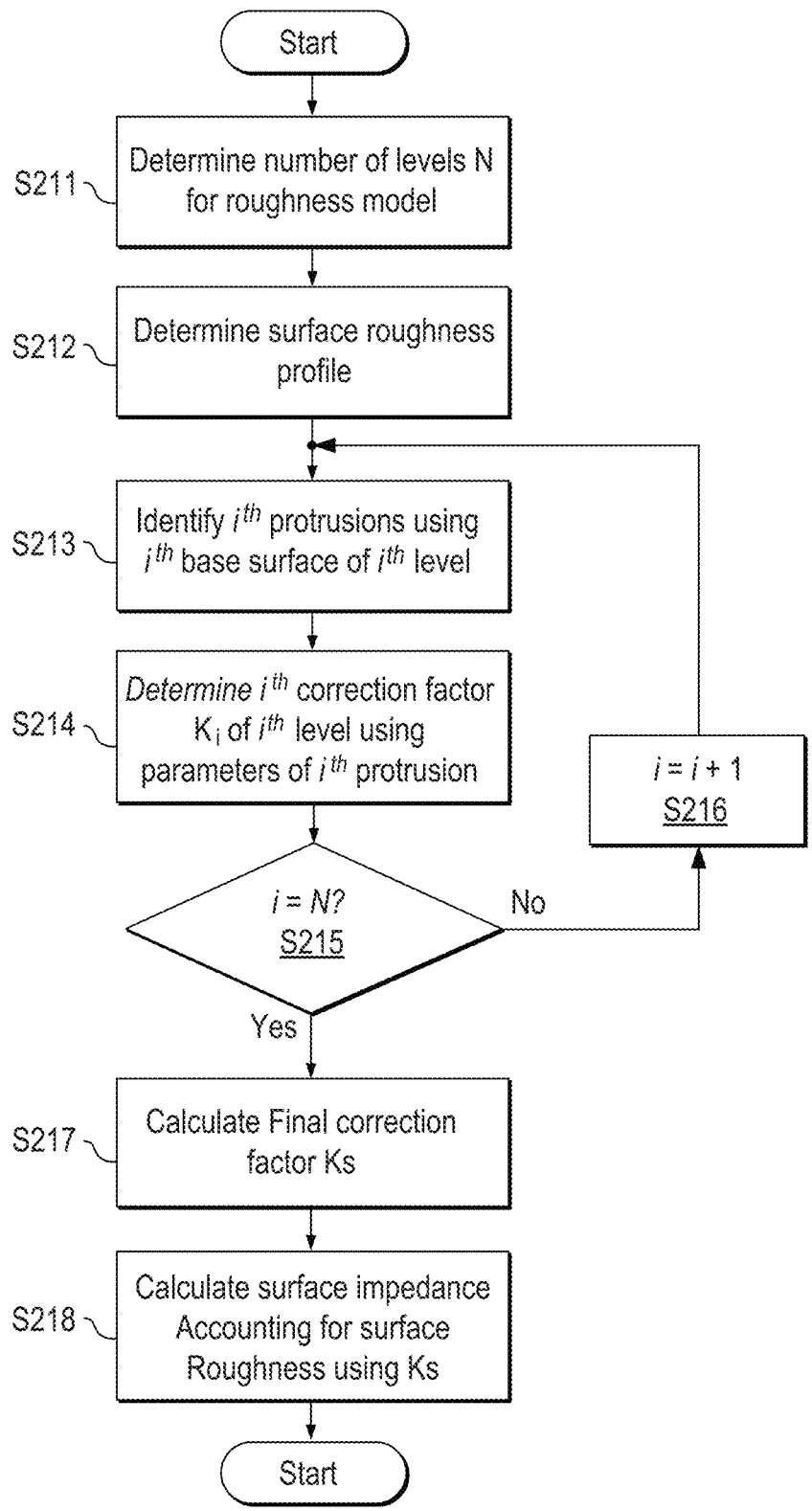
FIG. 2 is a flowchart illustrating a method of modeling surface roughness effect for a conductor, according to a representative embodiment.

FIG. 2 is a flowchart illustrating a method for modeling surface roughness effect of a conductor, according to a representative embodiment. The method may be implemented in whole or in part by a processor, such as processor 1021 in computer system 1015 described below with reference to FIG. 10. In various alternative embodiments, the method may be implemented by a processor, application specific integrated circuits (ASICs), field-programmable gate arrays (FPGAs), or combinations thereof, using software, firmware, hard-wired logic circuits, or combinations thereof. When using a processor, a memory is included for storing executable software/firmware and/or executable code that allows it to perform the various functions.

Referring to FIG. 2, the number of levels N of the multi-level model is initially determined at block S211, where N is an integer greater than one. For purposes of discussion, it is assumed that three levels are used for the multi-level model, and thus N is set to equal three (N=3). Any number of multiple levels may be used, without departing from the scope of the present teachings. For example, using three levels is generally sufficient for modeling conductor surface roughness effect at frequencies up to about 100 GHz. Of course, the bandwidth limit and thus the number of levels may be extended to any desirable value using more levels. More levels do not necessarily increase the effort for implementation, from the standpoint of additional computer code for implementing the multi-level model. For example, the multi-level model may be implemented using ten levels (N=10) as opposed to three levels (N=3), as discussed above, by repeating the processing steps for each additional level. However, implementing fewer levels may be provide sufficiently accurate result, while reduces complexity, e.g., in the user interface.

A roughness profile is determined at block S212. For example, FIG. 3(a) shows an illustrative roughness profile of a conductor surface using a multi-level hemispherical model having three levels (N=3), according to a representative embodiment. As shown, the multi-level hemispherical model characterizes the rough surface with protrusions (indicated as hemispheres in the example) of uniform size on three levels (as compared to the roughness profile depicted in FIG. 1(b), which has protrusions on only one level). A first level (level 1) includes first protrusions is on a first base, where the first base is the original flat plane of the conductor surface. A second level (level 2) includes second protrusions on a second base, where the second base includes the first protrusions and the first base. A third level (level 3) includes third protrusions on a third base, where the third base includes the second protrusions and the second base. The protrusions of each level are smaller than the protrusions of all lower levels. Thus, the second protrusions are smaller than the first protrusions, and the third protrusions are smaller than the second protrusions. The smaller protrusions of the second and third levels take into account the contribution from the smaller protrusions of the rough conductor surface at higher frequencies.

The roughness profile is decomposed into separate protrusions corresponding to the three hierarchical levels, as shown in FIG. 3(b). In various embodiments, the protrusions may have any arbitrary shape, although they are depicted as hemispheres for the convenience of illustration. The decomposition process is analogous to observing the rough surface of the conductor with a microscope and gradually increasing the magnification. The decomposition process is described with reference to blocks S213-S216 below.

In block S213, the $i^{th}$ protrusions are identified using an $i^{th}$ base surface of the $i^{th}$ level, where i is an integer initially set to equal one. Thus, for the first level (i=1), the first protrusions are identified using a first base surface. For the first level, the first base surface is the original flat surface of the conductor. The Level 1 protrusions shown in FIG. 3(c) are representative of the first protrusions determined in block S213 for the first level.

In block S214, an $i^{th}$ correction factor $K_i$ of the $i^{th}$ level is determined using parameters derived from the $i^{th}$ protrusions using any appropriate surface roughness model. Thus, for the first level (i=1), the first correction factor $K_i$ is determined using parameters of the first protrusions. For example, the correction factor $K_i$ may be calculated using the hemispherical model, as described by Hall et al., "Multigigahertz Causal Transmission Line Modeling Methodology Using a 3-D Hemispherical Surface Roughness Approach," IEEE TRANS. MTT, Vol. 55, No. 12, at p. 2621, as shown by Equation (1):

$$K_i = \frac{\left|\text{Re}\left[\eta \frac{3\pi}{4k^2}(\alpha(1) + \beta(1))\right]\right| + \frac{\mu_0 \omega \delta}{4}(A_{tile} - A_{base})}{\frac{\mu_0 \omega \delta}{4} A_{tile}} \quad (1)$$

In Equation (1), $\omega = 2\pi f$ (where f is the frequency of the signal transmitted through the conductor), $A_{tile}$ is the (square) tile area of the plane surrounding the protrusion and $A_{base}$ is the base area of the hemispheres, discussed further below with reference to Equations (3)-(5). Notably, the embodiments are not limited to using multiple levels of the hemispherical model. Rather, different surface roughness effect models may be used, such as the Hammerstad model or the Huray model, for all levels, or different surface roughness effect models may be used for difference levels. The surface roughness effect models used may vary to provide unique benefits for any particular situation or to meet application specific design requirements of various implementations, as would be apparent to one having ordinary skill in the art.

It is determined in block S215 whether i=N, in order to ascertain whether additional levels remain to be processed. At this point, it is determined that the current value of i (i=1) is not equal to the initially established value of N (N=3) (block S215: No). Therefore, the level i is incremented by one in block S216, and process returns to block S213.

Blocks S213-S216 are repeated until it is determined in block S215 that i=N (block S215: Yes). Thus, in the present example, second protrusions are identified using a second base surface of the second level (e.g., the first protrusions and the first base surface) in block S214, and a second correction factor $K_2$ of the second level is determined using parameters derived from the second protrusions using any appropriate surface roughness model in block S215. Subsequently, third protrusions are identified using a third base surface of the third level (e.g., the second protrusions and the second base surface) in block S214, and a third correction factor $K_3$ of the third level is determined using parameters derived from the third protrusions using any appropriate surface roughness model in block S215. The Level 2 and Level 3 protrusions shown in FIG. 3(c) are representative of the second and third protrusions sequentially determined in block S213 for the second and third levels, respectively.

Once it is determined that i=N (block S215: Yes), indicating that a correction factor $K_i$ has been determined for each level N, the final correction factor $K_S$ is calculated in block S217. In an embodiment, the final correction factor $K_S$ is calculated according to equation (1), below:

$$K_S = \prod_{i=1}^{N} K_i \quad (2)$$

As discussed above, the protrusions of level (i+1) are smaller than the protrusions of level i. In various embodiments, the protrusions of one level are significantly smaller the protrusions of the immediately preceding level. For example, the protrusion dimension ratio between level (i+1) and i may be less than about 0.3. With this condition satisfied, the curvature of level (i+1) protrusions is significantly greater than the curvature of i. Accordingly, all protrusions of level i and lower levels may be regarded as smooth surface when calculating $K_{i+1}$, where a smooth surface is a surface of the conductor without surface roughness effect. That is, the base surface of level (i+1) may be regarded as a smooth surface when calculating $K_{i+1}$.

In various embodiments, it is assumed that a smooth surface is obtained for each of the respective base surfaces by flattening the base surface in order to calculate the correction factor $K_i$, for convenience of understanding, where area-preserving mapping is used for flattening the base surface. Flattening generally refers to projecting the base surfaces to a flat surface, as would be apparent to one of ordinary skill in the art. Flattening the base surface may be implemented when calculation of the corresponding correction factor $K_i$ does not take into account curvature of the smooth surface, which is true for various surface roughness models, e.g., including the hemispherical model, the Hammerstad model and the Huray model mentioned above. In alternative embodiments, where the surface roughness model for a single level takes curvature of the smooth surface into account, the base surface need not be flattened, and the surface roughness model may be applied directly to the respective protrusions on the corresponding base surface, as is.

In block S218, a surface impedance of the conductor is calculated, where the surface impedance accounts for surface roughness using the final correction factor $K_S$ calculated in block S217. The surface impedance includes a final surface resistance $R_S$ and a final surface reactance $X_S$.

The final surface resistance $R_S$ is determined by the formula $R_S=K_S R_0$, where $R_0$ is the surface resistance for the smooth conductor without any surface roughness effect. The formula $R_S=K_S R_0$ may be derived by determining surface resistances of each level i. For example, the first protrusions of the first level are added to the smooth surface, and a surface roughness model is used to calculate the corresponding first correction factor $K_1$, as discussed above. The first surface resistance $R_1$ with the surface roughness effect from the first protrusions taken into account is $R_1=K_1 R_0$. The second protrusions of the second level are then added to the smooth surface, and a surface roughness model (which may be the same as or different from the surface roughness model used to calculate the first correction factor $K_1$) is used to calculate the corresponding second correction factor $K_2$. As discussed above, the second protrusions reside on the second base surface, consisting of the first protrusions and the original flat surface which may now be considered as a smooth surface with surface resistance $R_1$. The second surface resistance $R_2$ with the surface roughness effect from the second protrusions taken into account is $R_2=K_2 R_1$. Repeating this procedure for all additional levels (e.g., the third protrusions of the third level) yields Equation (2), above. Therefore, the final surface resistance $R_S$ may simply be determined by $R_S=K_S R_0$.

As required by causality, the final surface reactance $X_S$, which is the imaginary part of the surface impedance, may be determined using various techniques. For example, the final surface reactance $X_S$ may be determined as a Hilbert transform of the smooth conductor surface resistance $R_0$, as determined by the formula $X_S=H[K_S R_0]$, where H indicates the Hilbert transform, discussed for example by Hall et al., "Advanced Signal Integrity for High-Speed Digital Designs," JOHN WILEY & SONS, INC. (2009). Alternatively, the final surface reactance $X_S$ may be determined by multiplying imaginary part $X_0$ with the correction factor $K_S$, such that $X_S=K_S X_0$, where $X_0$ is the surface reactance of the smooth surface.

Figure 3:
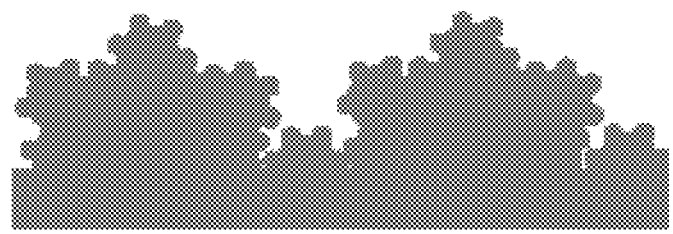
FIG. 3(*a*) shows a roughness profile of a copper surface, using a multi-level hemispherical model, according to a representative embodiment.
Figure 3:
Figure 3:
Figure 3:
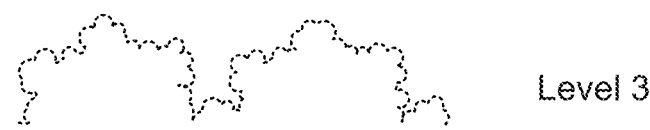
Figure 3:
Figure 3:
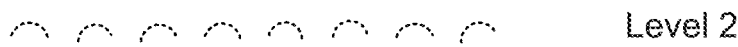
Figure 3:
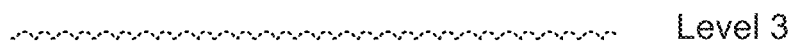

As discussed above, the final correction factor $K_S$ of the multi-level model is calculated from the correction factors $K_i$ for each level, according to various embodiments. Therefore, the parameters of the multi-level model are effectively a union of the parameters for each level. When a detailed roughness profile is available, e.g., from profilometer data, from atomic force microscopy (AFM), or SEM data, the decomposition process as illustrated in FIG. 3 can be used to obtain the roughness profile for each level. Then model parameter values for each level can be determined.

For example, when measured data, such as $S_{21}$ parameters, are available, the model parameters may be synthesized from the measured $S_{21}$ data. General purpose optimization tools may be used to synthesize the model parameters. Parameters of all levels do not have to be synthesized together. Since the roughness protrusion dimensions of each level are well apart, each level starts to contribute to the surface roughness effect subsequently as frequency increases. Using the measured $S_{21}$ data from low frequencies to high frequencies, the model parameters may be synthesized, level by level, from low to high.

The multi-level hemispherical model may be used as an example to show how to synthesize the model parameters from measured $S_{21}$ data. To show the impact of each parameter of the protrusions on the multi-level model, a representative manual process for synthesizing the parameters is described below. It is understood that the example is illustrative, and is not limiting of the scope of the various embodiments.

The hemispherical model generally includes three model parameters: the radius of the hemisphere $r_e$, the base area of the hemispheres $A_{base}$, and the area of the square tile $A_{tile}$ in which the protrusion resides. The three model parameters are described, for example, by Hall et al., "Multigigahertz Causal Transmission Line Modeling Methodology Using a 3-D Hemispherical Surface Roughness Approach," IEEE TRANS. MTT, Vol. 55, No. 12, at p. 2621. The three model parameters are determined from three roughness profile parameters, examples of which are shown in FIG. 4.

Figure 4:
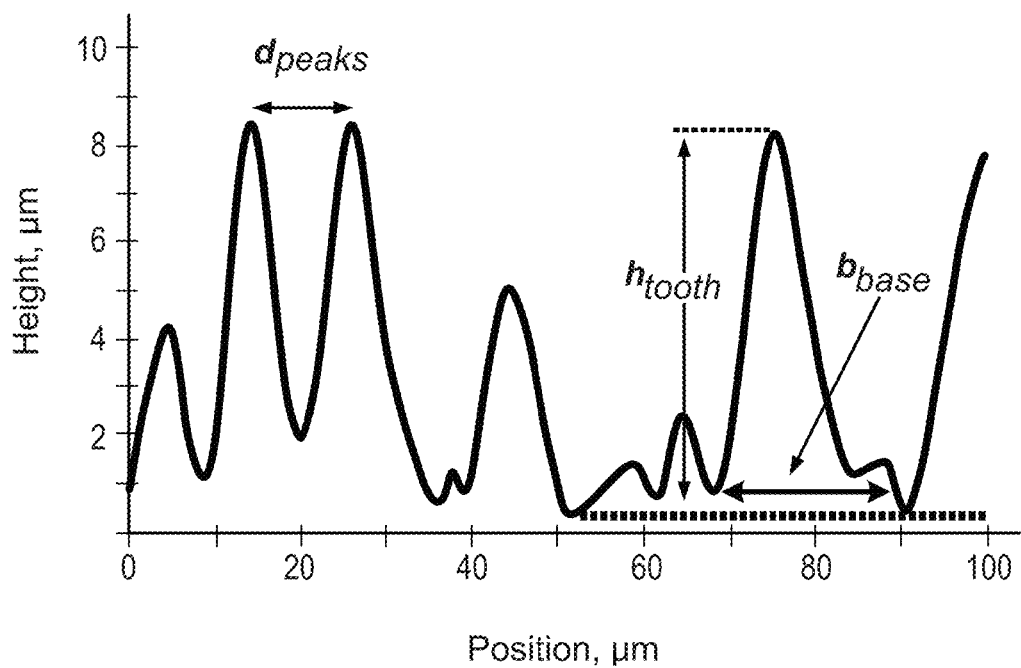
FIG. 4 is a graph showing height and position of protrusions and corresponding roughness profile parameters, according to a representative embodiment.

FIG. 4 is a graph showing a profilometer measurement of a rough copper surface, including height and position of protrusions and corresponding roughness profile parameters, according to a representative embodiment. Referring to FIG. 4, the three roughness profile parameters for the hemispherical model are $h_{tooth}$, which is the root mean square (RMS) value of the height of the protrusion, $b_{base}$, which is the RMS value of the base width of the protrusion, and $d_{peaks}$, which is the RMS value of peak distance between two adjacent protrusions. FIG. 4 shows peak heights that range from about 0.7 µm to about 8.5 µm, for example.

Accordingly, the three model parameters may be defined according to the following equations:

$$r_e = \sqrt[3]{h_{tooth}\left(\frac{b_{base}}{2}\right)^2} \quad (3)$$

$$A_{base} = \pi\left(\frac{b_{base}}{2}\right)^2 \quad (4)$$

$$A_{tile} = d_{peaks}^2 \quad (5)$$

For the multi-level hemispherical model, according to various embodiments, the model parameters exist for each level. For example, the model parameters at level i may be denoted with index [i], e.g., $r_e[i]$, $A_{base}[i]$ and $A_{base}[i]$. An illustrative synthesis procedure is based on the following guidelines. First, the size of the hemispheres at level i (i.e., $r_e[i]$) is the primary factor for identifying the frequency at which the hemispheres of level i start to contribute to the roughness effect, which may be referred to as the "knee frequency." The knee frequency exists because a roughness protrusion has no noticeable contribution to the roughness effect until the frequency is high enough for the size of the protrusion to be comparable to the skin depth.

Second, for each level i, the following ratio indicates the value of the corresponding correction factor $K_i$ at the high frequency limit:

$$\frac{\text{surface of area of hemisphere} + (A_{tile} - A_{base})}{A_{tile}} = \quad (6)$$

$$\frac{2\pi r_e^2 + (A_{tile} - A_{base})}{A_{tile}}$$

At the high frequency limit, the skin depth approaches zero and the correction factor $K_i$ approaches the surface area ratio between the rough surface and the smooth surface. Therefore, keeping $r_e$ unchanged and adjusting $A_{tile}$ and/or $A_{base}$ can change the magnitude of $K_i$ without significantly affecting the knee frequency.

Figure 5:
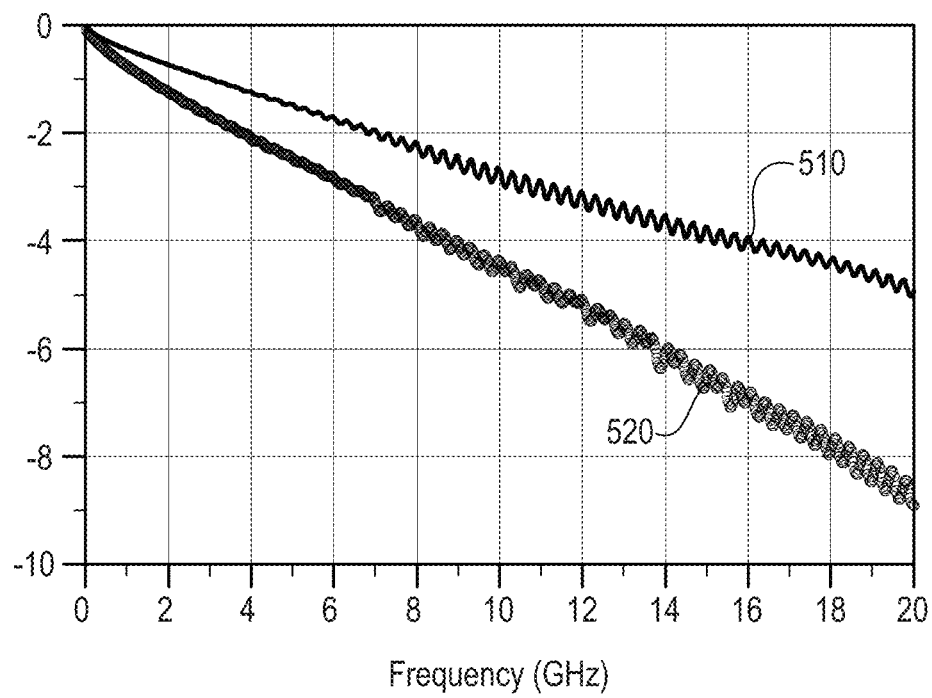
FIG. 5 is a graph showing insertion loss and frequency for measured data and for simulation results with no surface roughness effect compensation.

For purposes of illustration, an example is considered in which the surface roughness effect is determined for a 9.16 inch long copper stripline using multi-level hemispherical model. Initially, the $S_{21}$ parameter for forward transmission coefficient (gain) is measured and compared with simulation results obtained without any surface roughness effect. The results of the comparison are shown in the graph of FIG. 5, in which curve 510 shows the simulation result without surface roughness effect and curve 520 show the measured $S_{21}$ data. For purposes of discussion, it may be assumed that the difference between the simulation result and measured $S_{21}$ data is solely due to the surface roughness effect. That is, all other factors, such as connecting components in measurement, dielectric loss, etc., have been properly taken into account.

Figure 6:
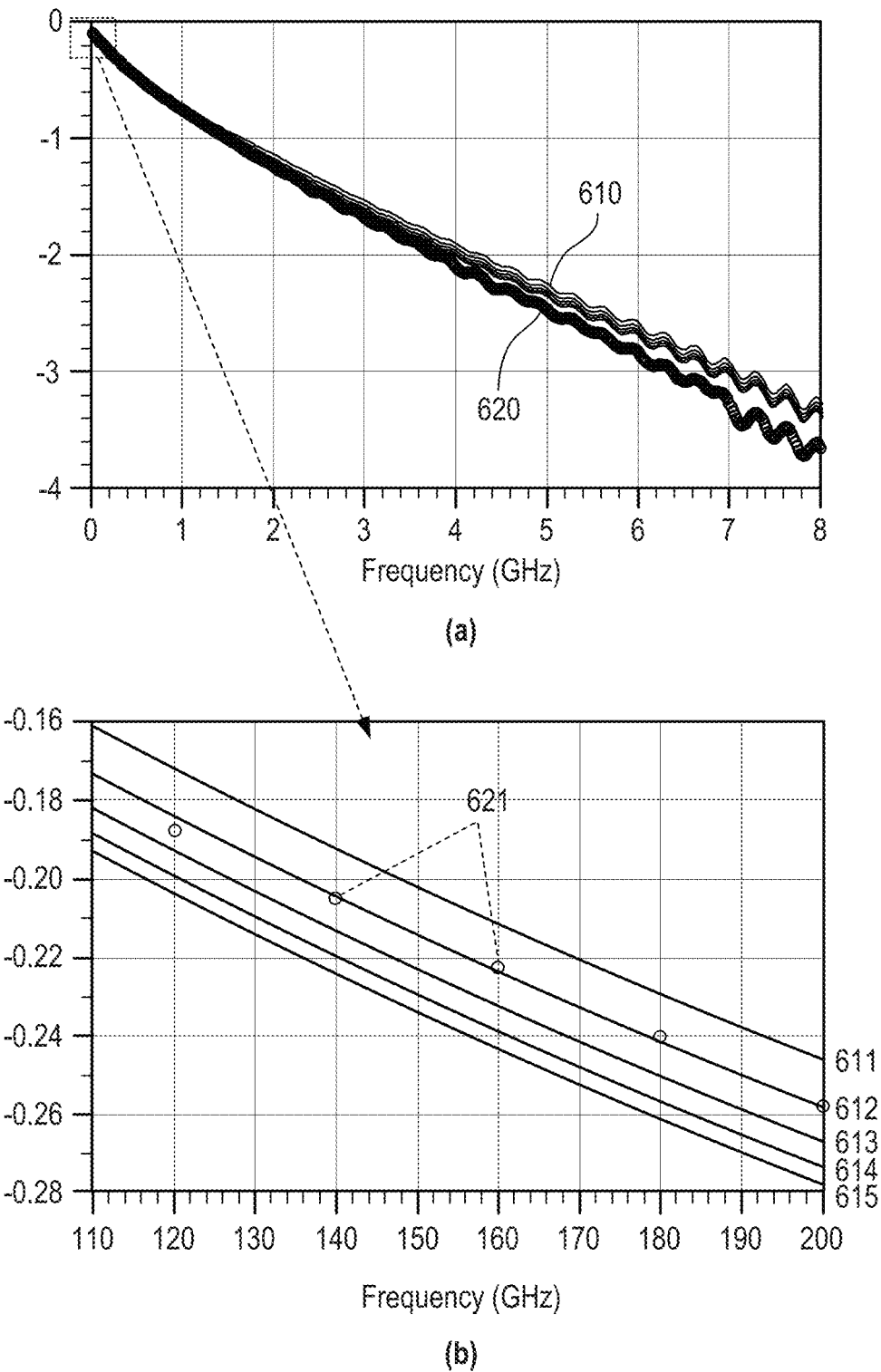
FIGS. 6(*a*) and 6(*b*) are graphs showing insertion loss and frequency for measured data and for multiple simulation results from swept $h_{tooth}$ parameter values using hemispherical modeling of surface roughness effect, according to a representative embodiment.

In order to synthesize the model parameters, $r_e$ must first be determined for the first level. FIGS. 6(a) and 6(b) are graphs showing insertion loss and frequency for measured data and for multiple simulation results from swept $h_{tooth}$ parameter values using hemispherical modeling of surface roughness effect. More particularly, FIGS. 6(a) and 6(b) show representative simulation results for sweeping $h_{tooth}$ (e.g., $h_{tooth}$=5, 6, 7, 8, 9 µm) for the first level, while setting the roughness profile parameters to $b_{base}=d_{peaks}=2h_{tooth}$. FIG. 6(a) is a graph that is substantially the same as a portion of FIG. 5 from 0 to 8 GHz, except that multiple simulation results without surface roughness effect are shown. Thus, multiple curves collectively labeled 610 show the simulation results without surface roughness effect and curve 620 shows measured $S_{21}$ data. By this setup, since $r_e=h_{tooth}$, sweeping $h_{tooth}$ is effectively equivalent to sweeping $r_e$. Also, the ratio provided by Equation (6), above, will not change while sweeping $h_{tooth}$.

FIG. 6(b) is a zoom-in view of a selected portion of FIG. 6(a), as indicated by the dashed arrow. The frequency range in FIG. 6(b) is around the knee frequencies for the swept values of $h_{tooth}$, where curve 611 shows $r_e$=5 µm, curve 612 shows $r_e$=6 µm, curve 613 shows $r_e$=7 µm, curve 614 shows $r_e$=8 µm, and curve 615 shows $r_e$=9 µm. FIG. 6(b) also shows representative measured data 621, indicated by small circles. The curve that best fits the measured data 621 is curve 612, where $h_{tooth}=r_e$=6 µm.

Next, the simulation curve is bent down, i.e., by increasing the high frequency limit value of the first correction factor $K_1$, to fit the measured $S_{21}$ data for a broader frequency range. This can be done, for example, by reducing $d_{peaks}$. However, $d_{peaks}$ cannot be less than $b_{base}$ due to the geometrical limits from their definitions, as shown in FIG. 4. Therefore, $d_{peaks}$ and $b_{base}$ must be reduced simultaneously. Consequently, from Equation (3) above, the following relationship must exist so that $r_e$ will not change, and thus the knee frequency will not change by any significant amount:

$$h_{tooth} = \frac{r_e^2}{(b_{base}/2)^2}$$

Figure 7:
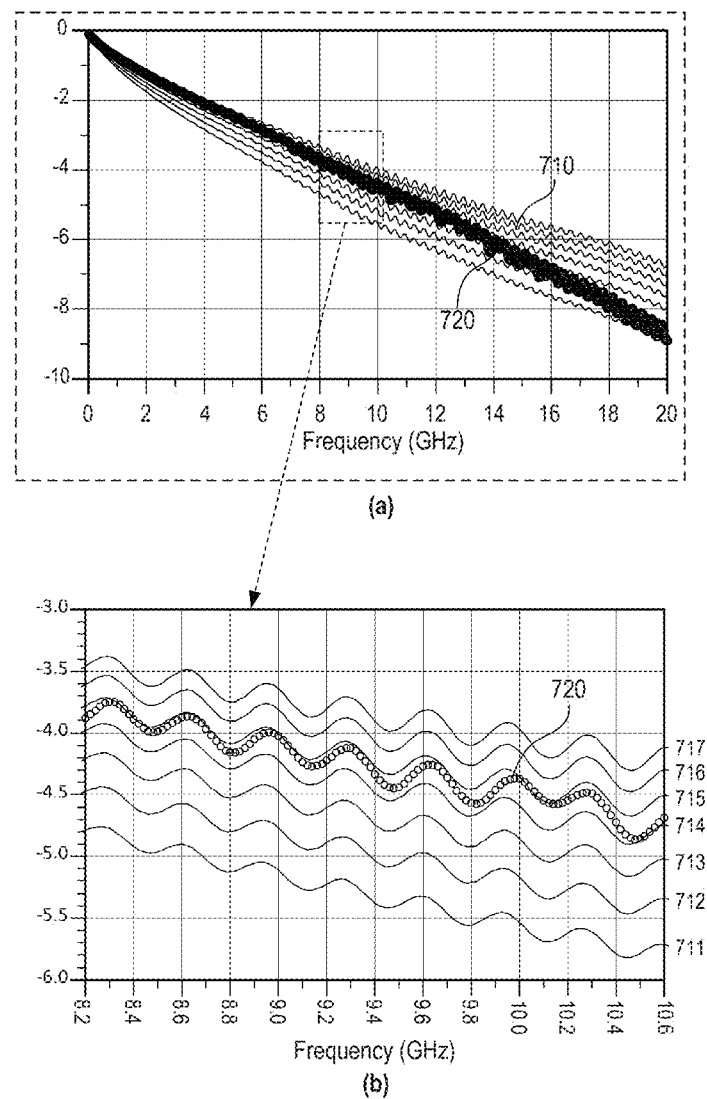
FIGS. 7(*a*) and 7(*b*) are graphs showing insertion loss and frequency for measured data and for multiple simulation results from swept $d_{peaks}$ parameter values using hemispherical modeling of surface roughness effect, according to a representative embodiment.

FIGS. 7(a) and 7(b) show the simulation results for sweeping $d_{peaks}$ and $b_{base}$, which are kept equal to each other during the sweep. FIG. 7(a) is a graph showing insertion loss and frequency for measured data and for multiple simulation results from swept $d_{peaks}$ parameter values using hemispherical modeling of surface roughness effect. Again, the graph shown in FIG. 7(a) is substantially the same as FIG. 5, except that multiple simulation results without surface roughness effect are shown. Thus, multiple curves collectively labeled 710 show the simulation results without surface roughness effect and curve 720 shows measured $S_{21}$ data.

Likewise, FIG. 7(b) is a zoom-in view of a selected portion of FIG. 7(a), between 8 GHz and 10 GHz, as indicated by the dashed arrow. In particular, FIG. 7(b) includes the swept values of $d_{peaks}$, where curve 711 shows $d_{peaks}$=9 µm, curve 712 shows $d_{peaks}$=9.5 µm, curve 713 shows $d_{peaks}$=10 µm, curve 714 shows $d_{peaks}$=10.5 µm, curve 715 shows $d_{peaks}$=11 µm, curve 716 shows $d_{peaks}$=11.5 µm, and curve 717 shows $d_{peaks}$=12 µm. FIG. 7(b) also shows curve 720, indicated by small circles. Referring to FIG. 7(b), the curve that best fits the curve 720 is curve 715, where $d_{peaks}$=11 µm.

Figure 8:
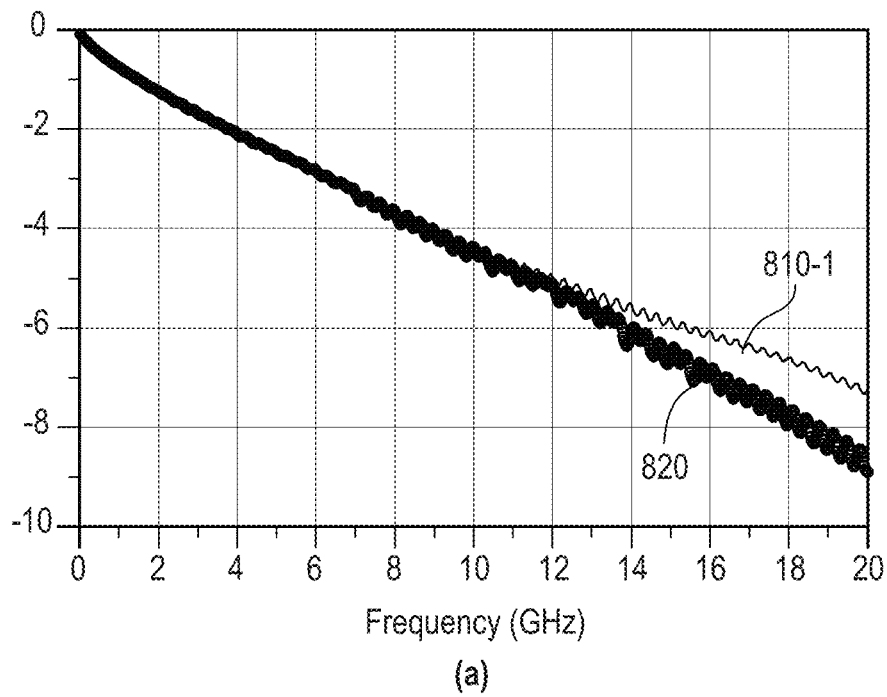
FIG. 8(*a*) is a graph showing insertion loss and frequency for measured data and for simulation results using one level of the hemispherical model, according to a representative embodiment.
Figure 8:
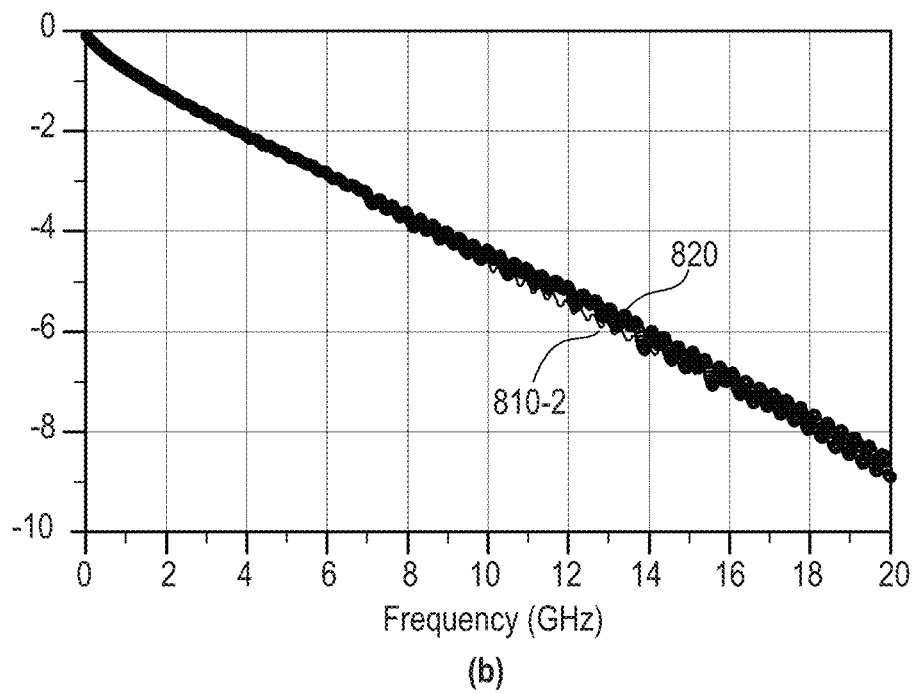

Accordingly, the roughness profile parameters for the first level of the multi-level hemispherical model have been synthesized, where $h_{tooth}[1]=r_e[1]$=6 µm and $b_{base}[1]=d_{peaks}[1]$ =11 µm. FIG. 8(a) is a graph showing a comparison between the simulation results using only one level of the hemispherical model, shown by curve 810-1, and the measured data, shown by curve 820.

In order to obtain a multi-level model, $r_e$ must next be determined for the second level. The roughness profile parameters for the second level may be synthesized using the same process discussed above with regard to synthesizing the first level roughness profile parameters. That is, the process includes sweeping $h_{tooth}$ for the second level, while setting the roughness profile parameters to $b_{base}=d_{peaks}=2h_{tooth}$, and reducing, $d_{peaks}$ and $b_{base}$ to increase frequency and bend down the simulation curve to fit the measured $S_{21}$ data for a broader frequency range.

Accordingly, in the present example, the roughness profile parameters for the second level of the multi-level hemispherical model are synthesized, where $h_{tooth}[2]=r_e[2]$=0.6 µm and $b_{base}[2]=d_{peaks}[2]$=1.05 µm. FIG. 8(b) is a graph showing the comparison between the simulation results using two levels of the hemispherical model, shown by curve 810-2, and the measured data, shown by curve 820. The measured data shown by curve 820 is matched quite well by using two levels of the multi-level hemispherical model shown by curve 810-2 in this particular example. Of course, more levels may be determined and incorporated if the measured data needs to be matched in a broader frequency range. Also, the number of levels may be increased until satisfactory results are obtained.

For purposes of illustration, another example is considered in which the surface roughness effect is determined for a 2 inch long coplanar waveguide using a multi-level hemispherical model, according to a representative embodiment. The results of the example are depicted in FIG. 9, which is a graph showing insertion loss and frequency for measured data and for simulation results using conventional models of surface roughness effect and using a multi-level model of surface roughness effect, according to a representative embodiment.

Figure 9:
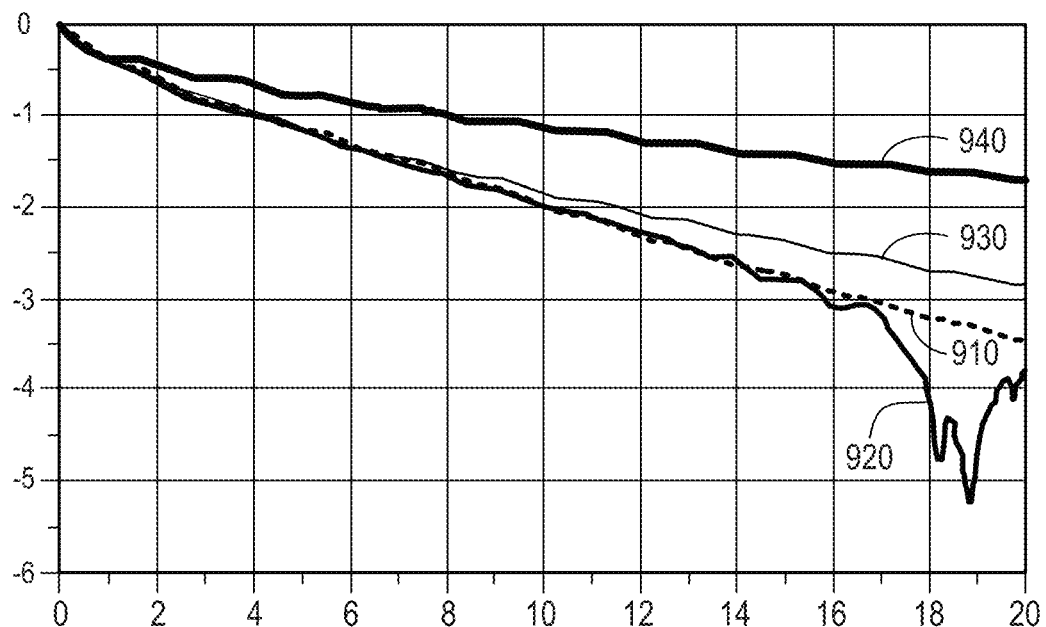
FIG. 9 is a graph showing insertion loss and frequency for measured data and for simulation results using conventional models of surface roughness effect and using a multi-level model of surface roughness effect, according to a representative embodiment.

More particularly, FIG. 9 shows the magnitude of measured $S_{21}$ parameter data (insertion loss) in comparison with simulation results from various surface roughness effect models, including a multi-level model according to a representative embodiment. Curve 920 shows the measured $S_{21}$ data, curve 930 shows a simulation result from the conventional, single level hemispherical model, curve 940 shows a simulation result from the conventional Hammerstad model, and curve 910 shows the simulation result from the multi-level model, according to a representative embodiment. More particularly, curve 910 shows a multi-level hemispherical model, examples of which are discussed above.

As indicated by curve 940, the Hammerstad model starts losing accuracy at about 1 GHz, and as indicated by curve 930, the conventional hemispherical model starts losing accuracy at about 10 GHz. The multi-level model shown by curve 910 matches the measured data of curve 920 very well over the entire frequency range. The dip in the measured data at about 19 GHz is generally caused by dielectric resonance.

Generally, users attain good prediction of the surface roughness effect from simulations directly based on roughness profile information. The multi-level model provides increased accuracy and working bandwidth over conventional, single level models. The multi-level model also does not require insertion loss or other types of measured data to calibrate model parameters.

Figure 10:
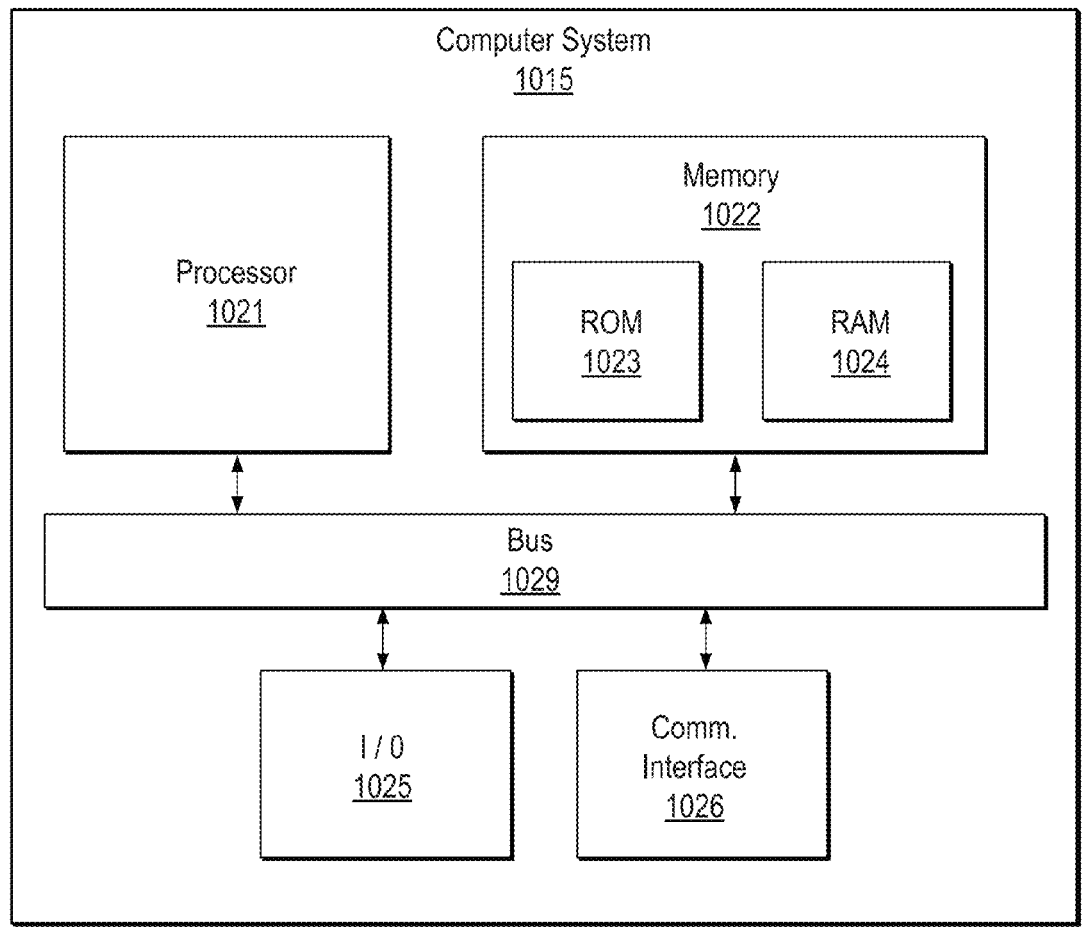
FIG. 10 is a functional block diagram showing an illustrative computer system for implementing multi-level surface roughness effect models, according to a representative embodiment.

As stated above, processes for modeling surface roughness effect of an electrical conductor may be completely or partially automated, e.g., using a computer system. FIG. 10 is a functional block diagram showing an illustrative computer system 1015 that executes all or a portion of a process for implementing a multi-level surface roughness effect model, according to a representative embodiment. The various "parts" shown in the computer system 1015 may be physically implemented using a software-controlled microprocessor, e.g., processor 1021, hard-wired logic circuits, firmware, or a combination thereof. Also, while the parts are functionally segregated in the computer system 1015 for explanation purposes, they may be combined variously in any physical implementation.

In the depicted embodiment, the computer system 1015 includes processor 1021, memory 1022, bus 1029 and various interfaces 1025-1026. The processor 1021 is configured to execute one or more logical or mathematical algorithms, including the multi-level surface roughness effect modeling process of the embodiments described herein (e.g., including the various steps of FIG. 2), in conjunction with the memory 1022. The processor 1021 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 1022, discussed below. In an embodiment, the processor 1021 may be a central processing unit (CPU), for example, executing an operating system, such as Windows operating systems available from Microsoft Corporation, NetWare operating system available from Novell, Inc., or Unix operating system available from Sun Microsystems, Inc. The operating system controls execution of other programs of the computer system 1015.

The memory 1022 may be any number, type and combination of nonvolatile read only memory (ROM) 1023 and volatile random access memory (RAM) 1024, and stores various types of information, such as computer programs and software algorithms executable by the processor 1021 (and/or other components), e.g., to perform location determination processes of the embodiments described herein. As generally indicated by ROM 1023 and RAM 1024, the memory 1022 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like. Further, the memory 1022 may store the predetermined boundaries one or more enterprise networks, as discussed above.

Further, data or other information (such as measurement data) may be received from various other components through communication or network interface 1026, and communicated to the processor 1021 and/or the memory 1022 via bus 1029. The type, number and arrangement of the network interfaces may vary. In an embodiment, a user and/or other computers may interact with the computer system 1015 using various input device(s) through I/O interface 1025. The input devices may include a keyboard, key pad, a track ball, a mouse, a touch pad or touch-sensitive display, and the like. Also, various information may be displayed on a display through a display interface (not shown), which may include any type of graphical user interface (GUI).

Various embodiments are directed to a computer implemented algorithm providing a method for calculating a final correction factor of a multi-level model for model surface roughness effect of a conductor. The embodiments are not limited to any particular surface roughness model for each level, and may include, for example, the hemispherical model, the Hammerstad model and/or the Huray model. Also, various implementations may include application of different surface roughness models for different levels. For example, the hemispherical model may be used for level 1 (which is particularly accurate at lower frequencies) and the Huray model may be used for higher levels to further extend the bandwidth.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of modeling surface roughness effect of an electrical conductor executed by a processor in a computer system, the method comprising:
   identifying first protrusions of a first level using an original flat surface of the conductor as a first base surface;
   determining a first correction factor of the first level using parameters of the first protrusions;
   identifying second protrusions of a second level using the first protrusions and the first base surface as a second base surface;
   determining a second correction factor of the second level using parameters of the second protrusions and regarding the second base surface as a smooth surface, the smooth surface being a surface of the conductor without surface roughness effect; and
   determining a final correction factor of the conductor by combining the first correction factor and the second correction factor.

2. The method of claim 1, wherein combining the first correction factor and the second correction factor comprises multiplying the first correction factor and the second correction factor.

3. The method of claim 1, further comprising:
   identifying third protrusions of a third level using the first and second protrusions and the first base surface as a third base surface;

determining a third correction factor of the third level using parameters of the third protrusions and regarding the third base surface as the smooth surface; and determining the final correction factor of the conductor by further combining the third correction factor with the first correction factor and the second correction factor.

4. The method of claim 1, wherein each of the first correction factor and the second correction factor is determined using a hemispherical model.

5. The method of claim 1, wherein each of the first correction factor and the second correction factor is determined using a Huray model.

6. The method of claim 1, wherein each of the first correction factor and the second correction factor is determined using a Hammerstad model.

7. The method of claim 1, further comprising:
calculating a final surface resistance of the conductor by multiplying the final correction factor of the conductor and a surface resistance of the original flat surface of the conductor.

8. The method of claim 7, further comprising:
calculating a final surface reactance of the conductor by performing a Hilbert transform of the final surface resistance.

9. The method of claim 7, further comprising:
calculating a final surface reactance of the conductor by multiplying the final correction factor of the conductor and a surface reactance of the original flat surface of the conductor.

10. The method of claim 1, wherein regarding the second base surface as the smooth surface comprises using an area preserving mapping for flattening the second base surface to the smooth surface.

11. The method of claim 1, wherein the second protrusions are smaller than the first protrusions.

12. The method of claim 11, wherein a protrusion dimension ratio between the second level and the first level is less than about 0.3.

13. A non-transitory computer readable medium for storing a program, executable by a computer system, for modeling surface roughness effect of an electrical conductor, the computer readable medium comprising:
an identifying code segment for identifying first protrusions of a first level using an original flat surface of the conductor as a first base surface, and for identifying second protrusions of a second level using the first protrusions and the first base surface as a second base surface;
a determining code segment for determining a first correction factor of the first level using parameters of the first protrusions, and for determining a second correction factor of the second level using parameters of the second protrusions and regarding the second base surface as a smooth surface, the smooth surface being a surface of the conductor without surface roughness effect; and
a final determining code segment for determining a final correction factor of the conductor by multiplying the first correction factor and the second correction factor.

14. The computer readable medium of claim 13, wherein the identifying code segment further identifies third protrusions of a third level using the first and second protrusions and the first base surface as a third base surface;
the determining code segment further determines a third correction factor of the third level using parameters of the third protrusions and regarding the third base surface as the smooth surface; and
the final determining code segment determines the final correction factor of the conductor by further multiplying the third correction factor with the first correction factor and the second correction factor.

15. The computer readable medium of claim 14, wherein the second protrusions are smaller than the first protrusions, and the third protrusions are smaller than the second protrusions.

16. The computer readable medium of claim 13, wherein the determining code segment determines each of the first correction factor and the second correction factor using at least one of a hemispherical model, a Huray model and a Hammerstad model.

17. The computer readable medium of claim 13, further comprising:
a surface resistance calculating code segment for calculating a final surface resistance of the conductor by multiplying the final correction factor of the conductor and a surface resistance of the original flat surface of the conductor.

18. The computer readable medium of claim 17, further comprising:
a surface reactance calculating code segment for calculating a final surface reactance of the conductor by performing a Hilbert transform of the final surface resistance.

19. The computer readable medium of claim 17, further comprising:
a surface reactance calculating code segment for calculating a final surface reactance of the conductor by multiplying the final correction factor of the conductor and a surface reactance of the original flat surface of the conductor.

20. A system comprising:
a processor configured to execute a computer program for modeling surface roughness effect of an electrical conductor using a multi-level model; and
a memory accessible by the processor and configured to store the computer program, wherein the computer program causes the processor to perform the steps of:
identifying a plurality of protrusions corresponding to a plurality of model levels, protrusions of a first model level being identified using an original flat surface of the conductor as a base surface, and protrusions of each subsequent model level being identified using protrusions and a base surface of an immediately preceding model level as a base surface of the subsequent model level;
determining a plurality of level correction factors for the plurality of model levels, respectively, using parameters of the protrusions corresponding to the model levels;
determining a final correction factor of the conductor by multiplying the plurality of level correction factors; and
calculating a final surface resistance of the conductor by multiplying the final correction factor of the conductor and a surface resistance of the original flat surface of the conductor,
wherein the protrusions of each subsequent model level are smaller than the protrusions of the immediately preceding model level.

* * * * *